(12) United States Patent
Bourne

(10) Patent No.: US 9,257,938 B2
(45) Date of Patent: Feb. 9, 2016

(54) INTEGRATED SYSTEM FOR COOLING A BUILDING, COLLECTING RAINWATER, AND CLEANING A ROOFTOP SOLAR ARRAY

(71) Applicant: Richard Curtis Bourne, Davis, CA (US)

(72) Inventor: Richard Curtis Bourne, Davis, CA (US)

( * ) Notice: Subject to any disclaimer, the term of this patent is extended or adjusted under 35 U.S.C. 154(b) by 133 days.

(21) Appl. No.: 13/955,526

(22) Filed: Jul. 31, 2013

(65) Prior Publication Data

US 2015/0033783 A1    Feb. 5, 2015

(51) Int. Cl.
*F25B 25/00* (2006.01)
*H02S 40/10* (2014.01)
*F24J 2/46* (2006.01)
*F24F 5/00* (2006.01)

(52) U.S. Cl.
CPC .............. *H02S 40/10* (2014.12); *F24F 5/0017* (2013.01); *F24F 5/0035* (2013.01); *F24J 2/461* (2013.01)

(58) Field of Classification Search
CPC ............ F28D 21/0001; F28D 21/0012; F28D 21/0019; F25J 5/00; F25J 1/0262
USPC ................... 62/235.1, 239.2, 259.2; 135/246; 136/246; 165/47, 48.1, 48.2, 49, 50
See application file for complete search history.

(56) References Cited

U.S. PATENT DOCUMENTS

| | | | | |
|---|---|---|---|---|
| 4,119,863 A | * | 10/1978 | Kelly | 290/55 |
| 4,273,184 A | * | 6/1981 | Tanaka et al. | 62/235.1 |
| 4,628,988 A | * | 12/1986 | Yovanofski | 165/48.2 |
| 5,174,128 A | * | 12/1992 | Bourne et al. | 62/373 |
| 5,542,260 A | * | 8/1996 | Bourne et al. | 62/171 |
| 2006/0159154 A1 | * | 7/2006 | Lackinger et al. | 373/60 |
| 2013/0118551 A1 | * | 5/2013 | Sako | 136/246 |
| 2014/0060620 A1 | * | 3/2014 | Placer | 136/246 |

* cited by examiner

*Primary Examiner* — William Gilbert

(57) ABSTRACT

This invention provides a simple integrated system that uses roof-spray, water collection, and water storage components to cool a building, collect and store rainwater, and clean a rooftop solar array.

2 Claims, 2 Drawing Sheets

INTEGRATED SYSTEM FOR COOLING A BUILDING, COLLECTING RAINWATER, AND CLEANING A ROOFTOP SOLAR ARRAY

INTRODUCTION

This invention relates generally to high-efficiency buildings in warm dry climates, and more particularly to low-rise buildings equipped with rooftop solar arrays. Building cooling systems traditionally use refrigerant-based vapor-compression equipment whose efficiency falls as outdoor temperatures rise. Such systems cause significant demands for electricity in hot weather. Thermal storage systems have been used to shift cooling electricity demand to off-peak periods. These systems typically operate vapor-compression equipment at night to chill or freeze water used for subsequent building cooling, helping to offset peak demands from conventional systems.

In dry climates, water use is increasingly controlled and expensive, causing growing interest in rainwater collection. In many regions, water systems rely on large dams and reservoirs, but most of the reasonable sites have been used so there is little opportunity for additional large-scale water storage. Also, reservoirs have limited and predictable lifetimes because they gradually silt up. In a few hundred years, the reservoirs will be shallow, yet will still be experiencing large evaporative losses in spite of their loss of storage capacity. A more attractive model for the future is to store water in or near buildings and other points of use, in closed containers that limit evaporative losses. Thus, it makes sense to combine rainwater and thermal storage functions in containers near buildings, so the water can be cooled at night and during other non-peak electricity hours, and then used for next-day building cooling.

Solar thermal and electric arrays are increasingly used on roofs to reduce energy use and peak energy demands in buildings. In many locations, the combination of clear skies and windblown dust and debris from agricultural and/or urban and suburban landscapes causes significant soiling of the solar arrays. Clear skies cause low surface temperatures at night due to sky-radiation; moisture in the air then condenses onto roof and solar array surfaces during non-solar hours. Airborne dust particles become trapped in the condensate, and in the subsequent daytime cycle the moisture evaporates, leaving the particles on the solar array surface. In dry climates with zero or minimal summer rainfall, dirt accumulates day-after day, reducing array efficiency by as much as 20% after six weeks without rainfall. Over-sizing arrays to adjust for soiling degradation can significantly increase costs.

BACKGROUND OF THE INVENTION

In dry climates with clear skies and moderate night temperatures, night-roof-spray (NRS) cooling systems (see U.S. Pat. No. 5,174,128 (Bourne) and U.S. Pat. No. 5,542,260 (Bourne)) provide a less-energy intensive alternative to vapor-compression technology for cooling thermal storage water, but this opportunity is relatively unknown in the industry, due to inadequate marketing and general fear of water on the roof. In dry conditions, NRS cooling offers an attractive combination of higher efficiency compared to evaporative and vapor-compression cooling systems, and lower water use compared to evaporative systems, since approximately 50% of NRS heat rejection is by radiation to the night sky; this heat transfer mode uses no water. Ice-making thermal storage systems need less storage volume but cannot take advantage of the NRS opportunity, and they lose efficiency due to low refrigerant evaporating temperatures. Cool water is a near-ideal thermal storage medium, since it doubles as a heat transfer fluid and is inexpensive to contain if space is available. Phase-change thermal storage materials that "freeze" at 55-60 F could use NRS cooling and are therefore attractive for the future, but so far they have high first costs and poor reliability.

NRS systems that collect spray-cooled water on the roof surface and store it to cool the building can also collect rainwater. NRS systems do use water, but if the storage reservoir is sufficiently large, they can operate through a typical cooling season just on collected rainwater. Evaporative cooling systems use at least twice as much water over a cooling season, so it is less practical to cool evaporatively without using piped-in "makeup" water. Also, in many dry-climate regions, water used in buildings comes from ground wells. Groundwater is usually laden with hardness minerals that cause maintenance problems in both water service systems and evaporative cooling systems. Since NRS systems typically use only 2" to 4" of rooftop water per year and most populated dry climate areas experience 8-30" of annual rainfall, it can be practical to implement water storage systems that satisfy full season cooling requirements without adding or purchasing water from a refill source. This strategy has the added advantage that rainwater contains no hardness minerals, minimizing maintenance issues in well-designed NRS systems.

For washing solar arrays, the prior art shows several "once-through" designs such as shown in U.S. Pat. No. 4,119,863 (Kelly), with nozzles for washing a solar array, and in a more recent European patent EU 4,119,863 (Magri), an invention that ambitiously advances a windshield-wiper-style array-washing mechanism. Aside from patents, several solar array-washing systems are commercially available. But none uses an "every night" recirculating water system. One advertised product includes soap dispensing (http://www.solarpanelcleaningsystems.com/). This and the wiper-design strategy apparently assume that washing every night will use too much water, and so they wash infrequently, thus requiring soap and even a wiping mechanism to remove the baked-on dirt. By comparison, the integrated approach of this invention uses the NRS feature justified for its cooling function and extends it to array cleaning as well. There is no added water use for this extension; and the wash frequency prevents dirt layers from "baking on," eliminating the need for wipers and soap. Also, the use of filtered rainwater assures effective cleaning without residue.

SUMMARY OF THE INVENTION

This invention provides an integrated system that cools a building without using compressors, cleans one or more solar arrays, and requires no refill water. While there has been considerable inventive work on thermal storage systems and on "once-through" intermittent washing systems for solar arrays, no prior art describes a simple integrated system that fulfills the three key functions of the present invention. This simple combination has not been "obvious to those skilled in the art" because of the segmentation of building design disciplines. At least three categories of designers design and specify the conventional system components combined in this invention. Mechanical engineers design and specify HVAC systems, electrical and solar engineers design and specify solar arrays, and civil engineers design and specify stormwater systems.

Two principal embodiments of this invention are described here. The first holds water in a shallow layer on the roof of the building, and delivers cooling to the building "passively" through a conductive roof/ceiling assembly. In this embodiment, there is no insulation between the water containment membrane and the cooled spaces below the ceiling. Instead, an insulation roof is placed above the water, with means provided for water sprayed above the roof to return to the water layer after collection. The second embodiment holds water in a dedicated reservoir with its weight supported by the ground, either below or above grade. Although this embodiment can also deliver cooling passively through conductive surfaces of an uninsulated above-floor reservoir, it more typically includes active delivery using a pumped loop through radiant surfaces or fan-coils. The drawings and text describe these two principal embodiments, but various modified configurations can be used without departing from the spirit and scope of the invention.

BRIEF DESCRIPTION OF THE DRAWINGS

The following description of the two principal embodiments of the invention refer to two drawings.

DETAILED DESCRIPTION OF THE PREFERRED EMBODIMENTS

Figure 1:
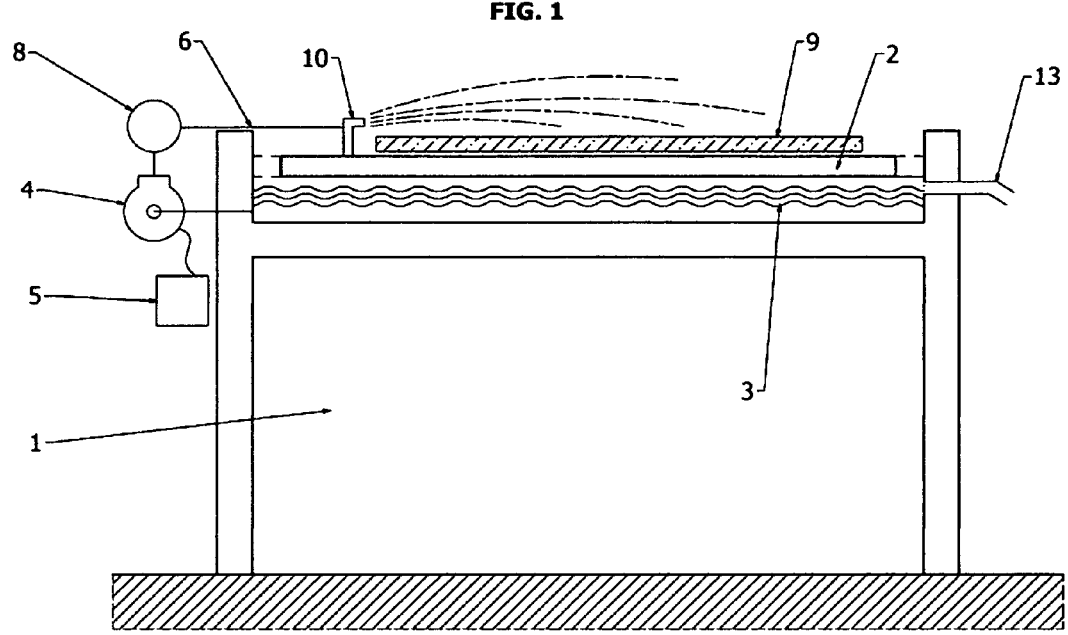
FIG. 1 is schematic cross-sectional view of the combined cooling, cleaning, and rainwater collection system with water distributed in a rooftop layer.

FIG. 1 shows a simple building cross-section with the essential features of the invention in a simple embodiment that cools a building directly through the ceiling. The drawing shows a one-story, one-room building 1, but this embodiment can also apply to multiple-room one-story buildings and to multi-story buildings with large stairwells or other openings that allow air cooled in contact with the top floor ceiling to fall to the lower floors. The building includes a conductive ceiling/structural roof/water containment layer 11 supporting and containing water layer 3. Layer 11 is generally level or "low slope" so that water depth and weight do not vary widely across the roof. The conductive structural layer is typically corrugated steel, sometimes with concrete included in a "composite deck" design. The water containment layer is typically a single-ply membrane that wraps up and over parapet walls to ensure a watertight roof. Weather-resistant insulated panels 2 are placed above the water layer. These may either float on the water or be supported together on the water containment layer. Water above the panels (either rain or roof spray) drains through panel joints into the water layer 3. On a schedule at night, controller activates pump 4 which sends water drawn from water layer 3 through filter 8 and then to spray heads 10 that distribute water over solar array 9 and exposed portions of panels 2, cleaning both the array and the roof, while cooling the water. The solar array can be either solar thermal or solar electric (photovoltaic) or both. Some water is lost due to evaporation and wind. In dry climates where the invention is most valuable, these losses typically amount to 2-3" of water per year, far less than annual rainfall rates of 8-30". Thus, a water layer of 5-8" is recommended to provide effective cooling performance through a dry summer without requiring water addition. When rainfall has fully refilled the water layer, excess water flows out through overflow drain 13. With passive cooling delivery, this embodiment typically results in a daily temperature range in the building of 5 to 8 degrees Fahrenheit.

Figure 2:
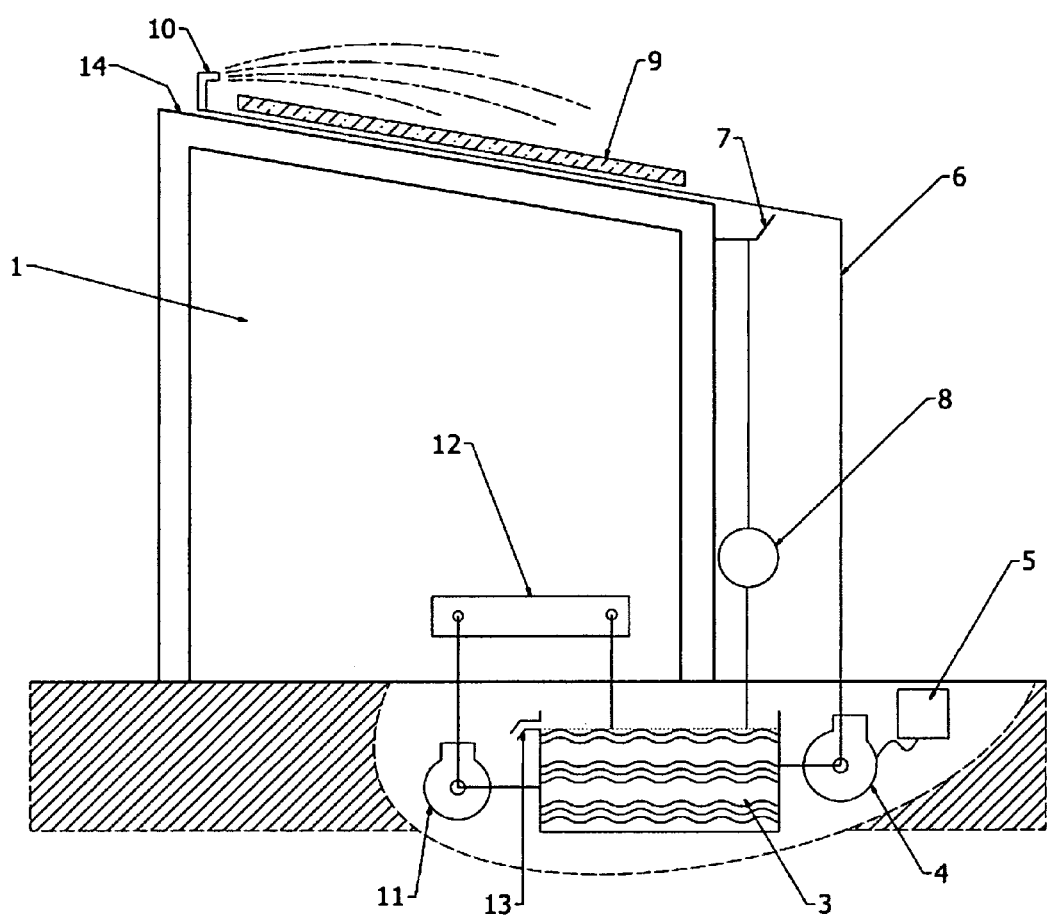
FIG. 2 is schematic cross-sectional view of the combined cooling, cleaning, and rainwater collection system with water contained in a below-grade reservoir.

FIG. 2 shows a second preferred embodiment with water stored off the roof and active cooling delivery. The cooled building 1 shown schematically with a single room has roof supporting solar array 9. Water reservoir 3 is shown located below the building floor but may alternatively be above grade either within, or exterior to, the building. Controller 5 causes pump 4 to operate during selected times to draw water from the reservoir and pump it upward through pipe 6 to spray array 10 that distributes water over solar array 9 and exposed portions of the roof, cleaning both the array and the roof, while cooling the water. Cooled water is collected at drain 7 and flows by gravity through filter 8 to the reservoir. The reservoir should be sized to hold the equivalent of a 5" to 8" water layer on the roof to maximize performance and eliminate the need for water addition. Cooling delivery pump 11 is activated in response to a thermostat to pump water through heat exchanger 12 to cool the building. The heat exchanger may be either a radiant surface system (typically at either the floor or the ceiling) or a forced-air system using a fan-coil, with or without ductwork. This active cooling delivery uses energy but can maintain a precise temperature setting.

What is claimed is:

1. A cooling and washing system, comprising:
    a first system comprising,
        a building having an insulated roof structure supporting a solar array on an upper surface of said roof structure, a drain configured to drain rainwater from said roof structure, and a spray array located proximal said solar array;
        a water reservoir located below said roof structure and below a floor of said building, or above ground and within said building, or above ground and exterior said building, said water reservoir having an overflow drain connected thereto;
        a first pump located exterior said reservoir and connected to said reservoir, and a controller connected to said pump;
        a first pipe connecting said pump to said spray array, said pipe having a portion located between said solar array and said roof structure;
        a filter between said drain and said reservoir and connecting said drain to said reservoir;
    a second system comprising,
        a cooler pump exterior said reservoir and connected to said reservoir;
        a thermostat configured to activate said cooler pump;
        a heat exchanger system between said cooler pump and said reservoir and connected to said cooler pump and said reservoir, said heat exchanger system being one of a radiant surface system or a forced-air system using a fan-coil;
        whereby said first pump operates via said controller to draw water from said reservoir to said spray array to spray water on an exterior surface of said array to cool said water and wash said solar array, said cooled water continuing to said drain, through said filter and returning to said reservoir; said cooler pump being activated in response to said thermostat to pump said cooled water from said reservoir through said heat exchanger to cool said building.

2. A method for collecting rainwater, cooling a building, and washing a solar array on the roof of a building, comprising the steps of:
    providing the cooling and washing system of claim 1;
    collecting and draining rainwater from said roof structure of said building into said reservoir;
    cooling water in said reservoir by using said first pump to spray said reservoir water on said roof structure and said solar array to cause radiative and evaporative cooling of said water while washing said roof and said solar array;
recollecting said cooled water via said roof drain;
draining said recollected water by gravity through said filter to remove dirt and debris that has collected on said roof structure and said solar array;
returning said recollected water to said reservoir after said water passes through said filter;
cooling said building by using said second pump to circulate said reservoir water through said heat exchanger system located within said building; and,
discharging excess rainwater from said overflow drain in said reservoir.

\* \* \* \* \*